O. MOBERG & E. HOOGE.
MANUFACTURE OF GLASSWARE.
APPLICATION FILED NOV. 16, 1915.
1,199,483.
Patented Sept. 26, 1916.
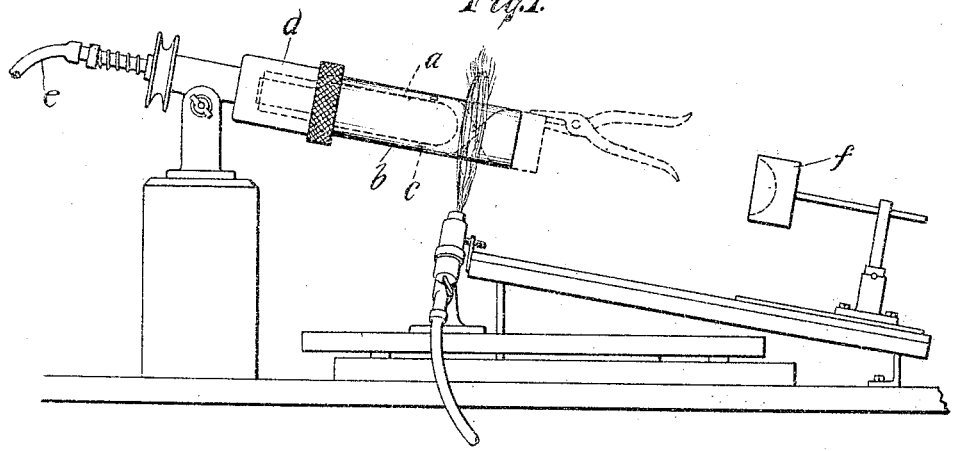
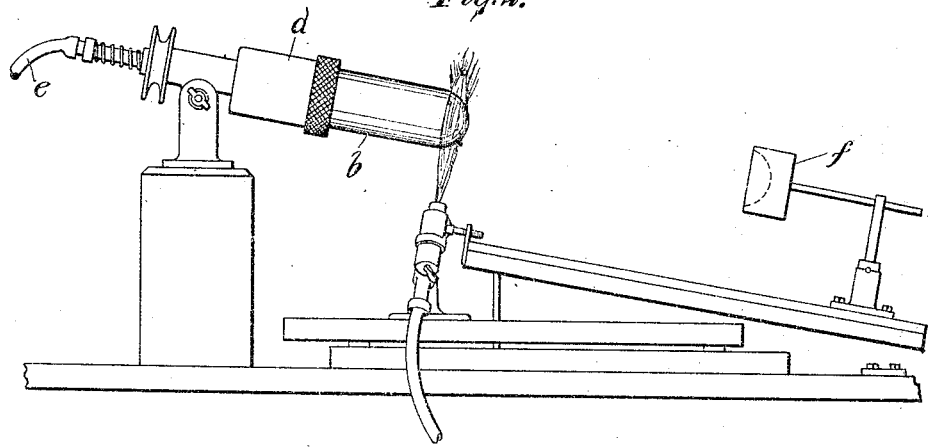
WITNESSES:
INVENTORS.
Oscar Moberg
Edward Hooge
BY
ATTORNEY.

UNITED STATES PATENT OFFICE.

OSCAR MOBERG AND EDWARD HOOGE, OF NEW BRITAIN, CONNECTICUT, ASSIGNORS TO LANDERS, FRARY & CLARK, OF NEW BRITAIN, CONNECTICUT, A CORPORATION OF CONNECTICUT.

MANUFACTURE OF GLASSWARE.

1,199,483.     Specification of Letters Patent.     Patented Sept. 26, 1916.

Application filed November 16, 1915. Serial No. 61,836.

*To all whom it may concern:*

Be it known that we, OSCAR MOBERG and EDWARD HOOGE, citizens of the United States, and residents of New Britain, in the county of Hartford and State of Connecticut, have invented certain new and useful Improvements in the Manufacture of Glassware, of which the following is a specification.

This invention relates particularly to improvements in processes and apparatus for the manufacture of vacuum receptacles, and has to do with the closing in of the bottom of the outer wall of the receptacle.

Figure 1 of the drawings shows the apparatus in side elevation. Fig. 2 shows members assembled ready for the finishing operation.

In the drawings, $a$ denotes the inner member, $b$ the outer member. The inner member is spaced from the outer member by the supports $c$, and by preference the bottom of the outer member is closed in before the two members are joined at the neck end. The neck end of the outer member is inserted in and gripped by a chuck $d$, driven in any suitable manner, the inner member as here shown being supported from the outer member, being spaced and held in proper position relative to the outer member by the supports $c$. Heat is applied to the skirt of the outer member until the glass is sufficiently soft to permit of its being gripped by tongs which twist off the edge of the skirt and leave the bottom of the outer member closed in. It needs now to be shaped, and strengthened and gaged, and this is done by applying heat to it while air is forced into its interior through the tube $e$ extending through the chuck, the final shaping and gaging being accomplished by a mold $f$ which is slidably mounted on the base of the machine and comes up into position against a stop, the soft glass being pressed out into the mold by the air pressure.

In order to strengthen the bottom of the outer member as much as possible after it has been closed in in the manner described, the axis of the chuck is inclined downwardly so that as the glass is heated and is in a somewhat molten state, it tends to flow down to the bottom with the result that the thickness of the bottom of the outer member is built up to the desired extent to insure sufficient strength at this point of the bottle where possibly it is subjected to the most severe duty.

While the invention may be adapted for other uses than in the manufacture of vacuum bottles, it finds a peculiar utility in this connection, owing to the fact that the bottom of the outer member must be left open for the insertion and positioning of the inner member, and must then be closed in, which closing in process tends to draw the glass down and thin the wall, and leave a weak spot, unless it is subsequently strengthened, as it may be by the practice of this invention.

We claim as our invention:

1. In a machine of the character described, a chuck arranged with its axis slightly inclined downwardly from the horizontal and adapted to receive and support a blank, means for rotating said chuck, means for closing the bottom of the blank, and means for introducing pneumatic pressure into said blank through the neck thereof after the bottom has been closed, to assist in shaping and finishing the bottom.

2. That improvement in the art of closing in, shaping and finishing the bottom of the outer member of a double-walled vacuum receptacle which consists in supporting said member in a chuck with its bottom exposed and in such manner as to give to the said member a slight downward inclination from the horizontal, rotating said chuck and heating the bottom of the lower member, closing it in, shaping and finishing it while rotating, whereby the material is caused to flow down toward the bottom of the member and increase the thickness of the wall at and near where the curvature of the bottom commences.

3. That improvement in the art of closing in, shaping and finishing the bottom of the outer member of a double-walled vacuum receptacle, which consists in rotatably supporting the blank, heating, closing in, shaping and finishing the bottom, and positioning the blank during said operation at a slight downward inclination from the horizontal so as to cause the material of the blank to flow toward the bottom.

OSCAR MOBERG.
EDWARD HOOGE.

Witnesses:
 JOHN A. BERTINI,
 A. G. ANDERSON.